United States Patent
Yamada et al.

(10) Patent No.: US 7,181,962 B2
(45) Date of Patent: Feb. 27, 2007

(54) THERMAL FLOW SENSOR

(75) Inventors: Masamichi Yamada, Hitachinaka (JP);
Izumi Watanabe, Hitachinaka (JP);
Keiichi Nakada, Hitachinaka (JP);
Junichi Horie, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 10/546,174

(22) PCT Filed: May 26, 2004

(86) PCT No.: PCT/JP2004/007542

§ 371 (c)(1),
(2), (4) Date: Aug. 18, 2005

(87) PCT Pub. No.: WO2004/106863

PCT Pub. Date: Dec. 9, 2004

(65) Prior Publication Data

US 2006/0144138 A1    Jul. 6, 2006

(30) Foreign Application Priority Data

May 30, 2003   (JP) ............................. 2003-153680

(51) Int. Cl.
*G01F 1/68*   (2006.01)

(52) U.S. Cl. .................................. 73/204.26

(58) Field of Classification Search ............... None
See application file for complete search history.

(56) References Cited

U.S. PATENT DOCUMENTS

| | | | | |
|---|---|---|---|---|
| 5,852,239 A | * | 12/1998 | Sato et al. ............... | 73/204.26 |
| 6,557,411 B1 | * | 5/2003 | Yamada et al. .......... | 73/204.26 |
| 6,923,053 B2 | * | 8/2005 | Yamada et al. .......... | 73/204.26 |
| 2003/0183000 A1 | * | 10/2003 | Yamada et al. .......... | 73/204.26 |
| 2004/0244479 A1 | * | 12/2004 | Matsumoto et al. ..... | 73/204.26 |

FOREIGN PATENT DOCUMENTS

| | | |
|---|---|---|
| JP | 11-230802 | 8/1999 |
| JP | 2000-275077 | 6/2000 |
| JP | 2001-41790 | 2/2001 |
| JP | 2002-48616 | 2/2002 |

* cited by examiner

*Primary Examiner*—Harshad Patel
(74) *Attorney, Agent, or Firm*—Crowell & Moring LLP

(57) ABSTRACT

A thermal flow sensor which is fabricated at a low cost and has improved reliability. Over a cavity (7) formed in a semiconductor substrate (2), at least a heating resistance (4) is formed near the center of the cavity with an electrical insulation film interposed between the heating resistance and the cavity. The temperature (Th) of the heating resistance (4) is controlled to be higher than the medium temperature (Ta) by a constant temperature ($\Delta Th = Th - Ta$). A distance (Ws) in the direction of airflow from an upstream end of the heating resistance (4) to an upstream end of the electrical insulation film lying over the cavity and the constant temperature ($\Delta Th$) satisfy the following relationship:

$$\Delta Th/Ws \leq 800 \ (°C./mm)$$

Thus, a thermal flow sensor is provided which can prevent deposition of floating fine particles, such as carbon particles, caused by the thermophoretic effect, can be fabricated at a low cost, and has high reliability.

8 Claims, 13 Drawing Sheets

THERMAL FLOW SENSOR

TECHNICAL FIELD

The present invention relates to a thermal flow sensor, and more particularly to a thermal flow sensor suitable for measuring an amount of intake air in an internal combustion engine.

BACKGROUND ART

As flow sensors disposed in electronically controlled fuel injectors of internal combustion engines for, e.g., automobiles to measure an amount of intake air, thermal flow sensors have been prevalently employed in the past because of the capability of directly detecting an air amount by mass.

Of those thermal flow sensors, attention has been focused particularly on a flow sensor fabricated using semiconductor micromachining techniques for the reason that such a thermal flow sensor can be produced at a lower cost and can be driven with smaller power. That type of known thermal flow sensor using a semiconductor substrate is disclosed, for example, in JP-A-2001-41790 filed by the applicant of this application.

The known thermal flow sensor disclosed in JP-A-2001-41790 is of the so-called temperature difference type in which, over a cavity formed in a semiconductor substrate, a heating resistance is formed with an electrical insulation film interposed between the heating resistance and the cavity, a pair of temperature measuring resistances are arranged upstream and downstream of the heating resistance in spaced relation, and a flow rate is measured from a temperature difference between the upstream and downstream temperature measuring resistances.

That thermal flow sensor of the temperature difference type measures the flow rate from a change of temperature distribution (temperature difference) in the electrical insulation film lying over the cavity in the direction of airflow, but the temperature distribution (measurement accuracy) is greatly affected by respective shapes of the electrical insulation film, the heating resistance, and the temperature measuring resistances arranged upstream and downstream of the heating resistance, which are all positioned over the cavity, as well as by relative positional relationships among those members.

In the above-mentioned related art, the respective shapes of the electrical insulation film, the heating resistance, and the temperature measuring resistances arranged upstream and downstream of the heating resistance, which are all positioned over the cavity, as well as the relative positional relationships among those members are specifically defined for the purposes of improving symmetry of the temperature distribution in the electrical insulation film lying over the cavity, widening a range of measurable flow rate, and realizing a high-speed response.

However, the disclosed arrangement has the problem as follows. Because of not sufficiently taking into consideration reliability resulting when the thermal flow sensor is mounted in an internal combustion engine for an automobile, etc. and is used under severe environmental conditions for a long term, there occurs a phenomenon that floating fine particles, such as carbon particles, are deposited thick on the electrical insulation film lying over the cavity due to the thermophoretic effect during use for a long term. Accordingly, the accuracy in measurement cannot be maintained at a sufficient level for a long term.

Further, the related art trying to cope with the above-described contamination is disclosed, for example, in JP-A-11-230802 that was also filed by the applicant of this application.

According to the related art disclosed in JP-A-11-230802, a photo-catalyst film is formed on a protective film covering a heating resistance, and a light emitting means is provided to illuminate light to the photo-catalyst film, thereby reducing an influence of the contamination based on the photo-catalyst effect.

DISCLOSURE OF THE INVENTION

However, the known thermal flow sensor thus constructed has the problem as follows. Because of the necessity of not only additionally forming the photo-catalyst film, but also providing the light emitting means to illuminate light to the photo-catalyst film, the size of the flow sensor itself is enlarged and the number of parts is increased, thus resulting in an increase of cost.

An object of the present invention is to provide a thermal flow sensor which can prevent deposition of floating fine particles, such as carbon particles, on the electrical insulation film lying over the cavity caused by the thermophoretic effect even when the thermal flow sensor is mounted in an internal combustion engine for an automobile, etc. and is used under severe environmental conditions for a long term, which can be fabricated at a low cost, and which has high reliability.

To achieve the above object, the present invention provides a thermal flow sensor including at least a heating resistance formed over a cavity, which is formed in a semiconductor substrate, near the center of the cavity with an electrical insulation film interposed between the heating resistance and the cavity, the sensor measuring a flow rate by controlling a temperature of the heating resistance to be higher than a temperature of a medium to be measured by a constant temperature, wherein the temperature (Th) of the heating resistance is controlled to be higher than the medium temperature (Ta) by a constant temperature ($\Delta$Th=Th−Ta), and a distance (Ws) in the direction of airflow from an upstream end of the heating resistance to an upstream end of the electrical insulation film lying over the cavity and the constant temperature ($\Delta$Th) satisfy the following relationship:

$$\Delta Th/Ws \leq 800 \ (^\circ C./mm)$$

With those features, it is possible to prevent deposition of floating fine particles, such as carbon particles, caused by the thermophoretic effect without newly adding any part (such as light emitting means).

Also, by setting the constant temperature ($\Delta$Th) to be not higher than 160° C. and the distance (Ws) to be not smaller than 0.2 mm, the deposition of the floating fine particles, such as the carbon particles, can be prevented with higher reliability.

Further, at least one pair of temperature measuring resistances are formed on the electrical insulation film lying over the cavity upstream and downstream of the heating resistance in spaced relation, and the flow rate is measured from a temperature difference between the pair of temperature measuring resistances. Such an arrangement can also prevent the deposition of the floating fine particles, such as the carbon particles.

Moreover, the electrical insulation film lying over the cavity is substantially rectangular in shape, and a central area of the cavity is partly widened to have an increased width larger than a width (W) of the cavity in a flow direction of the medium, thereby providing a substantially cross shape. Those features can more effectively prevent the deposition of the floating fine particles, such as the carbon particles, caused by the thermophoretic effect.

Furthermore, the electrical insulation film lying over the cavity is substantially rectangular in shape, and auxiliary heating resistances are formed at upstream and downstream ends of the electrical insulation film to heat boundaries of the electrical insulation film at the upstream and downstream ends thereof. With those features, it is possible to not only prevent the deposition of the floating fine particles, such as the carbon particles, caused by the thermophoretic effect, but also to self-diagnose breakage of the electrical insulation film from electrical conduction states of the auxiliary heating resistances.

By using the above-mentioned thermal flow sensor to measure an amount of intake air in an internal combustion engine in which a flow speed of the medium to be measured is set 0.25 m/sec or over at the lowest flow speed in ordinary conditions, an internal combustion engine control unit for controlling a fuel injection amount can be realized at a lower cost with high reliability.

BEST MODE FOR CARRYING OUT THE INVENTION

Embodiments of the present invention will be described below with reference to the drawings.

Figure 1:
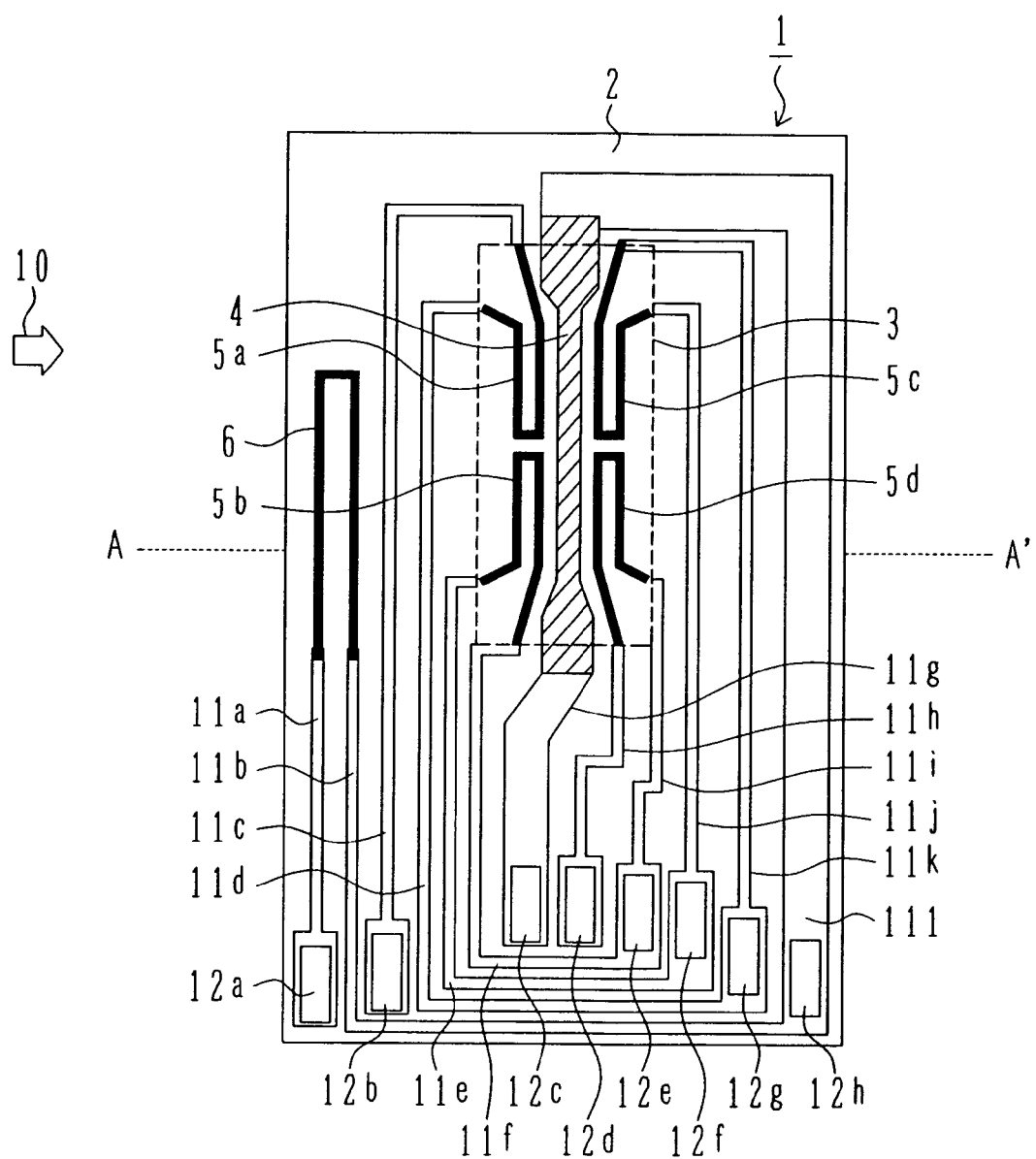
FIG. 1 is a plan view of a thermal flow sensor device 1 according to one embodiment of the present invention.
Figure 2:
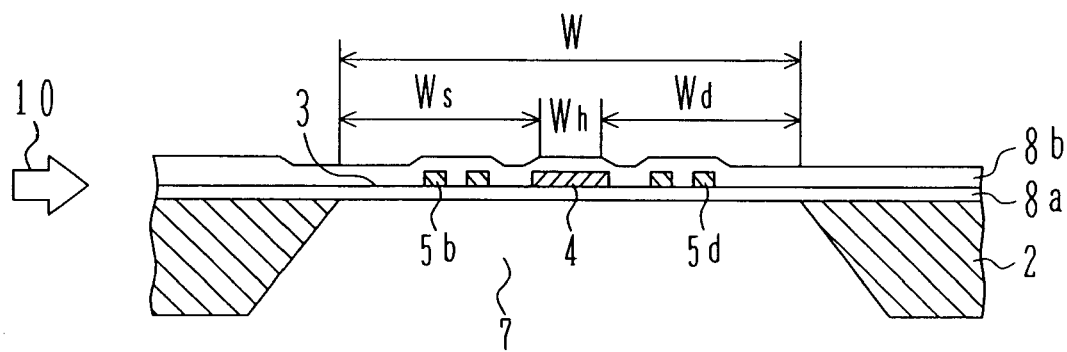
FIG. 2 is a sectional view of the device shown in FIG. 1 taken along the line A–A'.
Figure 3:
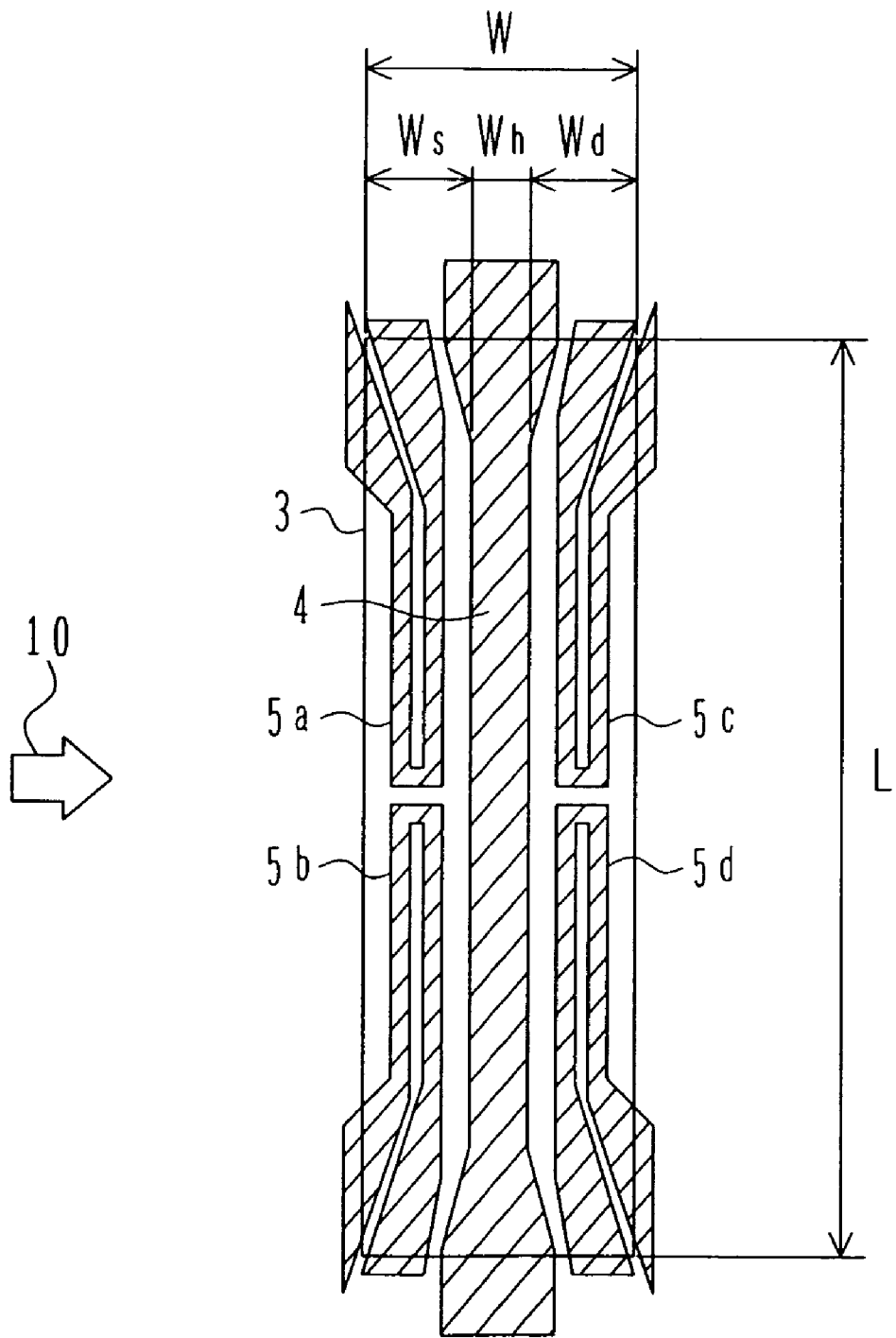
FIG. 3 is an enlarged view of a diaphragm portion 3 of the device shown in FIG. 1.

FIG. 1 is a plan view of a thermal flow sensor device 1 according to one embodiment of the present invention, FIG. 2 is a sectional view of the measuring device 1 shown in FIG. 1 taken along the line A–A', and FIG. 3 is an enlarged view of an electrical insulation film (diaphragm portion) 3 lying over a cavity in FIG. 1.

In FIGS. 1, 2 and 3, the device 1 comprises a semiconductor substrate 2 made of a single-crystal silicon (Si) and having a cavity 7 formed therein in a substantially rectangular shape (of a length (L) and a width (W)), a diaphragm portion 3 made up of an electrical insulation film 8a lying over the cavity 7 and an electrical insulation film 8b for protecting various resistances, a heating resistance 4 having a width (Wh), upstream-side temperature measuring resistances 5a, 5b and downstream-side temperature measuring resistances 5c, 5d, a medium temperature measuring resistance 6 formed in an upstream area of the substrate 2 and constituting a bridge circuit (not shown) in combination with the heating resistance 4 to measure a medium temperature, terminals 12 (12a, 12b, 12c, 12d, 12e, 12f, 12g and 12h) for connecting signals from the device 1 to a driving/control circuit, and wired connecting portions 11 (11a, 11b, 11c, 11d, 11e, 11f, 11g, 11h, 11i, 11j, 11k and 11l) for connecting the resistances to the corresponding terminals 12.

The resistances 4, 5a, 5b, 5c, 5d and 6 are each formed of a semiconductor thin film made of polycrystalline or single-crystal silicon (Si) and doped with impurities. The heating resistance 4 is arranged in a central area of the diaphragm portion 3 to extend on a substantially linear line in a direction perpendicular to a medium flow. Also, the electrical insulation films 8a, 8b forming the diaphragm portion 3 are each made of silicon dioxide ($SiO_2$) or silicon nitride ($Si_3N_4$) and formed as a thin film of about 2-micron thickness to provide a structure capable of ensuring a sufficient thermal insulation effect.

The thermal flow sensor according to this embodiment of the present invention operates as follows.

The heating resistance 4 formed on the electrical insulation film 8a and thermally insulated by both the cavity 7 and the electrical insulation films 8a, 8b is supplied with a heating current so that the temperature (Th) of the heating resistance 4 is controlled to be higher than the temperature (Ta) of the medium temperature measuring resistance 6, which represents the temperature of a medium flow 10, by a constant temperature ($\Delta Th = Th - Ta$).

The flow rate and direction of the medium flow 10 are detected by comparing temperatures (resistance values) of the upstream-side temperature measuring resistances 5a, 5b and the downstream-side temperature measuring resistances 5c, 5d with each other, which are arranged respectively upstream and downstream of the heating resistance 4. In other words, when the medium flow is zero, the upstream-side temperature measuring resistances 5a, 5b and the downstream-side temperature measuring resistances 5c, 5d show almost the same temperature and produce no temperature difference.

On the other hand, when the medium flow 10 advances in a direction shown in FIG. 1 (i.e., forward), the upstream-side temperature measuring resistances 5a, 5b arranged on the upstream side are basically subjected to a larger cooling effect by the medium flow 10 than the downstream-side temperature measuring resistances 5c, 5d arranged on the downstream side. This produces a temperature difference between the upstream-side temperature measuring resistances 5a, 5b and the downstream-side temperature measuring resistances 5c, 5d, and the flow rate is measured from that temperature difference.

Also, when the medium flow 10 advances oppositely to the direction shown in FIG. 1 (i.e., backward), the temperature of the downstream-side temperature measuring resistance 5c, 5d is lower than that of the upstream-side temperature measuring resistances 5a, 5b, and the sign of the temperature difference between the upstream-side temperature measuring resistances 5a, 5b and the downstream-side temperature measuring resistances 5c, 5d is reversed. The flow rate can be measured from the temperature difference, and the direction of the medium flow 10 can be detected from the sign of the temperature difference.

Figure 4:
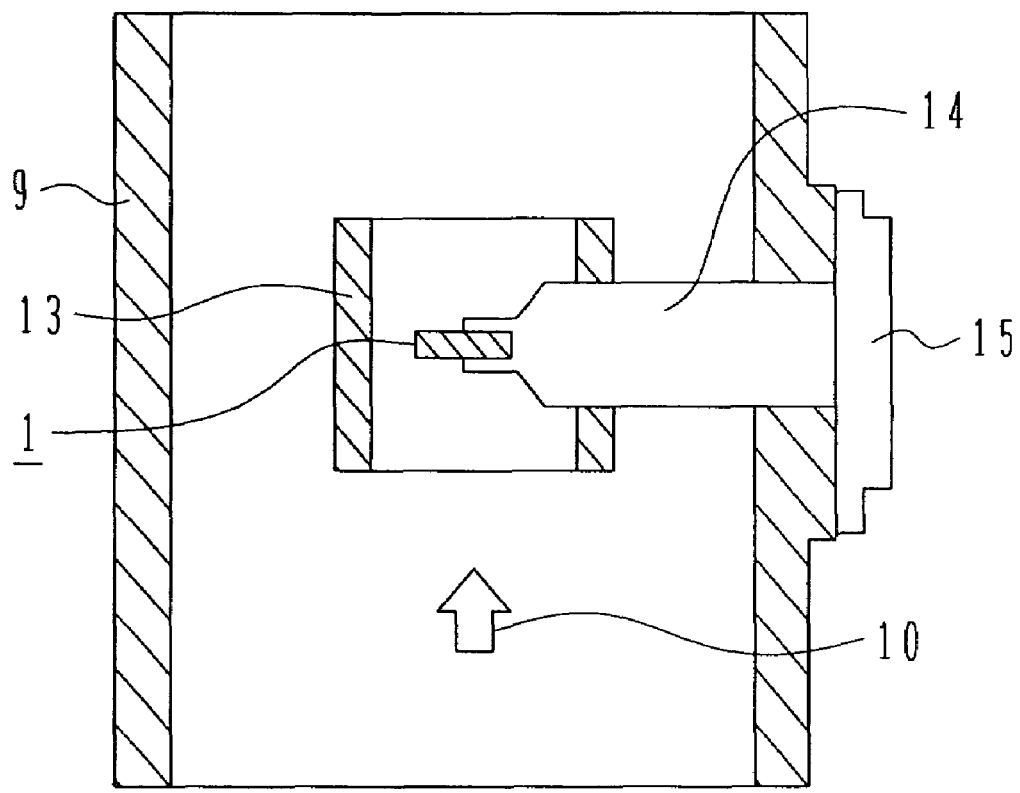
FIG. 4 shows a mounting structure of the thermal flow sensor device 1.

FIG. 4 is a sectional view showing one example of the thermal flow sensor in which the device 1 shown in FIG. 1 is mounted. In other words, FIG. 4 is a sectional view showing one example of the thermal flow sensor which is mounted in an intake passage of an internal combustion engine for an automobile, etc. The thermal flow sensor comprises, as shown, the device 1, a support 14, and an external circuit 15. The device 1 is disposed in a sub-passage 13 provided within an intake passage 9. The external circuit 15 is electrically connected to the terminals 12 of the measuring device 1 via the support 14.

Figure 5:
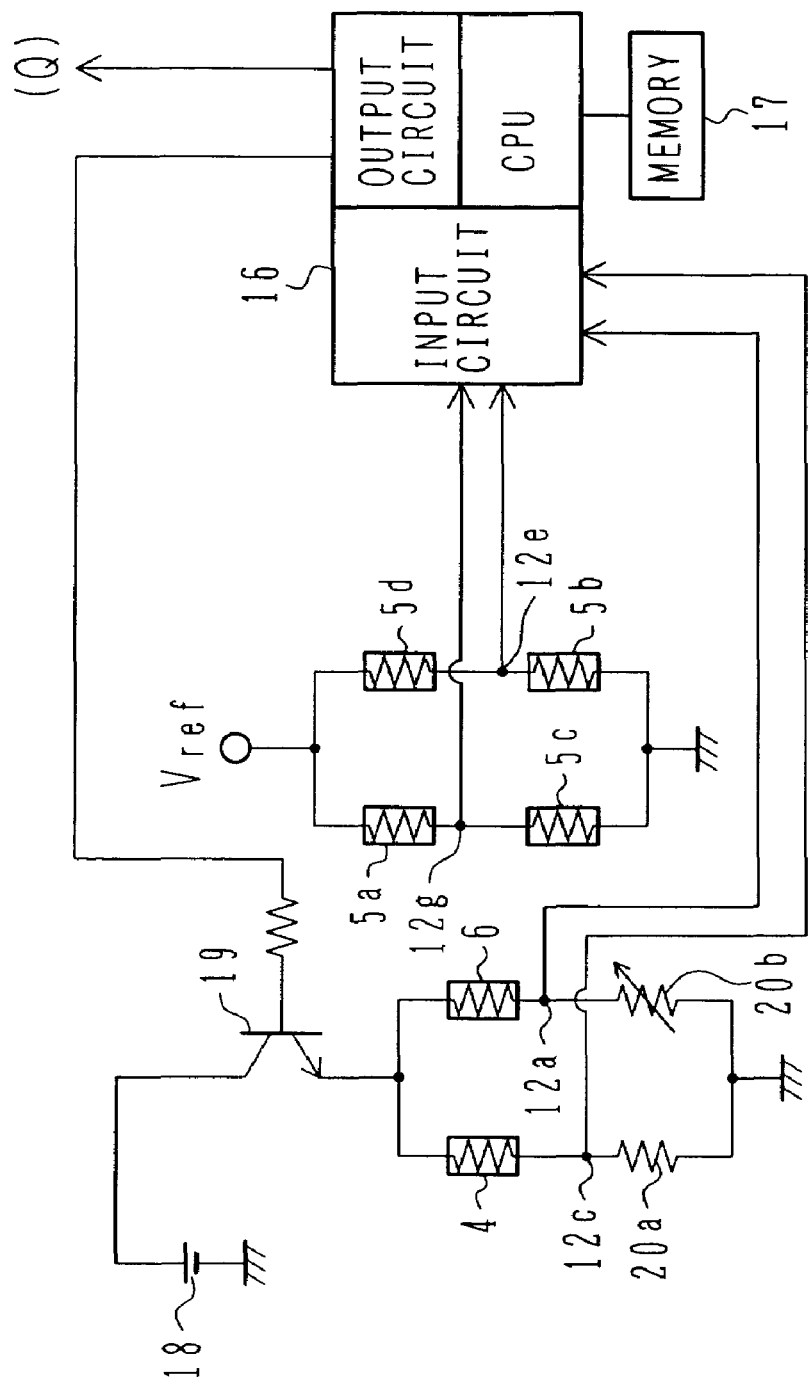
FIG. 5 is an electrical circuit diagram of resistances 4, 5a, 5b, 5c, 5d and 6.

The circuit operation in this embodiment of the present invention will be described below with reference to FIG. 5. FIG. 5 shows the resistances 4, 5a, 5b, 5c, 5d and 6 of the device 1, shown in FIG. 1, and a driving/control circuit. In FIG. 5, numeral 18 denotes a power supply, 19 denotes a transistor for supplying a heating current to the heating resistance 4, 20a and 20b denote resistances, 16 denotes a control circuit made up of an input circuit including an A/D converter, etc., an output circuit including a D/A converter, etc., and a CPU for executing arithmetic/logical processing, etc., and 17 denotes a memory circuit.

In such an arrangement, voltages at the terminals 12a, 12c of a bridge circuit constituted by the heating resistance 4, the medium temperature measuring resistance 6, and the resistances 20a, 20b are inputted to the control circuit 16. The resistance values 20a, 20b are set and controlled by the control circuit 16 so that the temperature (Th) of the heating resistance 4 is held higher than the temperature (Ta) of the medium temperature measuring resistance 6, which corresponds to the medium temperature, by the constant temperature ($\Delta Th = Th - Ta$).

The temperature difference between the upstream-side temperature measuring resistances 5a, 5b and the downstream-side temperature measuring resistances 5c, 5d is detected from a potential difference between the terminals 12g and 12e of a bridge circuit constituted by the upstream-side temperature measuring resistances 5a, 5b and the downstream-side temperature measuring resistances 5c, 5d.

For measuring the flow rate, the relationship between a flow rate (Q) and the potential difference, which is detected between the terminals 12g and 12e of the bridge circuit, is stored in the memory 17 in the form of a map beforehand. Based on the stored map, the flow rate and the flow direction can be measured and outputted from the potential difference between the terminals 12g and 12e and the relationship between the magnitudes of potentials at those terminals.

A description is now made of a phenomenon that floating fine particles, such as carbon particles, are deposited due to the thermophoretic effect when the thermal flow sensor having the above-described construction is mounted in an internal combustion engine for an automobile, etc. and is used under severe environmental conditions for a long term.

Figure 6:
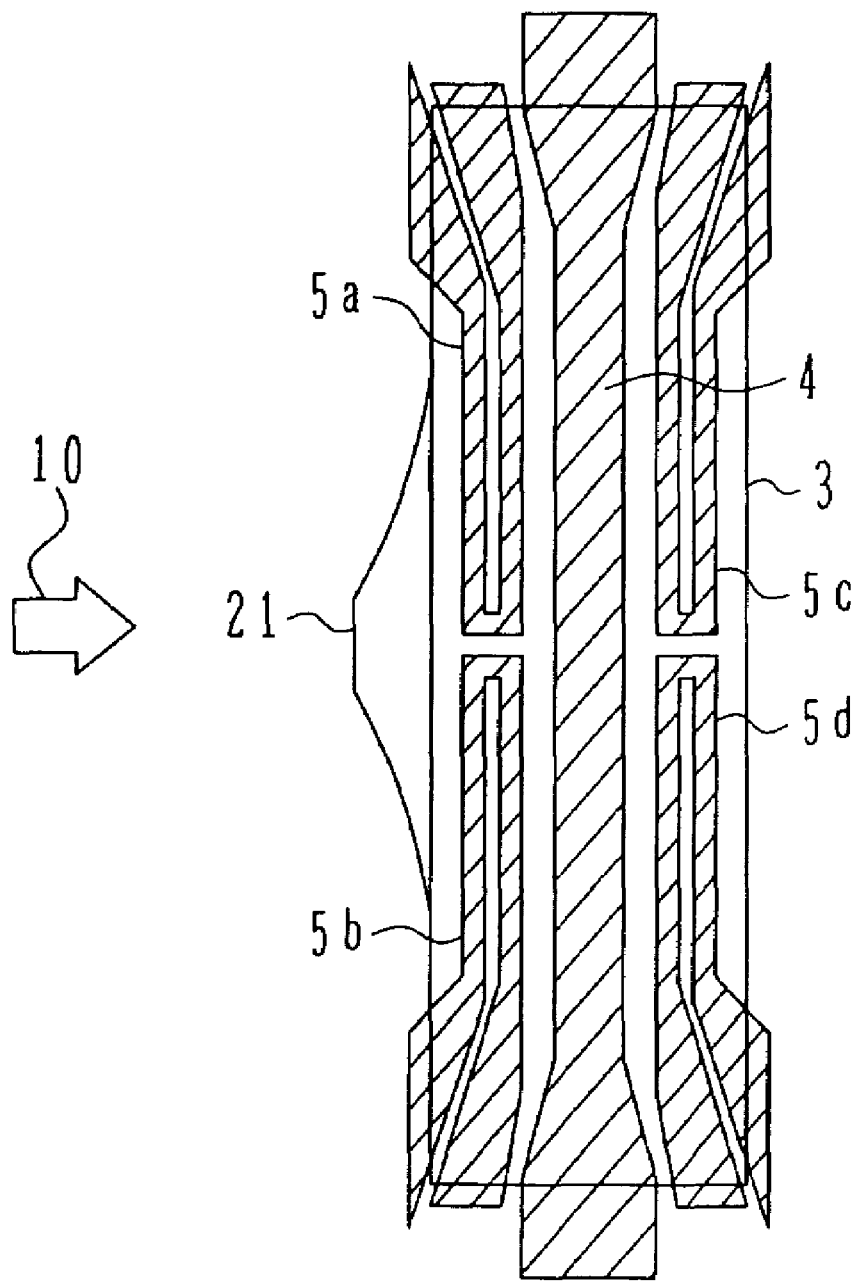
FIG. 6 is an explanatory plan view of the diaphragm portion 3.
Figure 7:
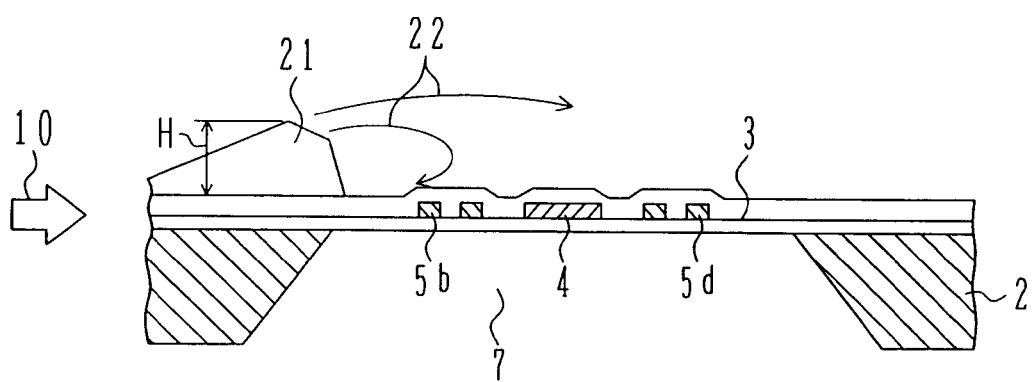
FIG. 7 is an explanatory sectional view of the diaphragm portion 3 in FIG. 6.

FIG. 6 is an enlarged plan view of the diaphragm portion 3 of the thermal flow sensor where the deposition of floating fine particles, such as carbon particles, has been observed after the use for a long term, and FIG. 7 is a sectional view of the diaphragm portion 3.

Numeral 21 denotes the floating fine particles, such as the carbon particles. After the use for a long term, the floating fine particles are deposited particularly upstream of the diaphragm 3 at its boundary with respect to the substrate 2 and in a central area along the boundary in a concentrated way. Another feature is that the particles are deposited in a larger amount when the medium flows at a lower speed, and the particles are hardly deposited on the downstream side.

As seen from FIG. 7, the amount of floating fine particles 21, such as carbon particles, deposited upstream of the diaphragm 3 is gradually increased with the lapse of time in use, and a deposition height (H) reaches a value of several tens μm in the worst case. When the floating fine particles are deposited in such a large amount, the airflow 10 is disturbed, as indicated by 22 in FIG. 7, by the deposited floating fine particles 21, such as the carbon particles, which behave as an obstacle. This causes the airflow 10 not to properly reach the heating resistance 4 and the temperature measuring resistances 5a, 5d which are formed on the diaphragm 3, whereby the detection accuracy of the flow rate is deteriorated.

The phenomenon (thermophoretic effect) of specific deposition of the floating fine particles 21, such as the carbon particles, on the diaphragm portion 3 will be described in more detail.

The floating fine particles 21, such as the carbon particles, have sizes of about several μm. When the particles sizes are in that order, the speed of the particles moving downward under the action of gravity is very low, and the particles are in a state floating with the airflow.

The term "thermophoretic effect" means such a property of those floating fine particles that they tend to deposit on a wall surface due to a temperature gradient. Stated another way, the thermophoretic effect is a phenomenon noticeably affecting, in particular, particulate materials having small particle sizes at which the Brownian motion takes an important role, i.e., a phenomenon that, when there is a temperature gradient in a gaseous medium, the particulate materials are caused to diffuse toward a lower temperature zone and to deposit on a wall surface in that zone. Thus, when the gaseous medium has a relatively high temperature and the wall surface has a relatively low temperature, diffusion and deposition due to the thermophoresis become much more dominate than ordinary diffusion and deposition.

Because the molecular motion of the gaseous medium is more active at a higher temperature and the momentum given to particles upon collision between them is larger in the higher temperature side than in the lower temperature side, the above-mentioned phenomenon eventually produces an active force on the particulate materials due to the thermophoretic effect based on the difference in the molecular motion caused by the temperature difference. Such an active force gives a moving speed (v) to the particulate materials. The moving speed (v) is expressed by the following formula;

$$v = -C \times (va/Ta) \times grad(Ta)$$

where Ta is the medium temperature, va is the coefficient of medium kinematic viscosity, and C is the coefficient of thermophoresis.

As seen from the above formula, the thermophoretic effect is more noticeable when the medium temperature (Ta) is at a lower level and the medium temperature in a space has a larger gradient (i.e., a steeper temperature distribution).

The specific phenomenon of deposition of the floating fine particles, such as the carbon particles, shown in FIGS. 6 and 7 can be explained based on the thermophoretic effect. The cause of developing that phenomenon will be described below.

Figure 8:
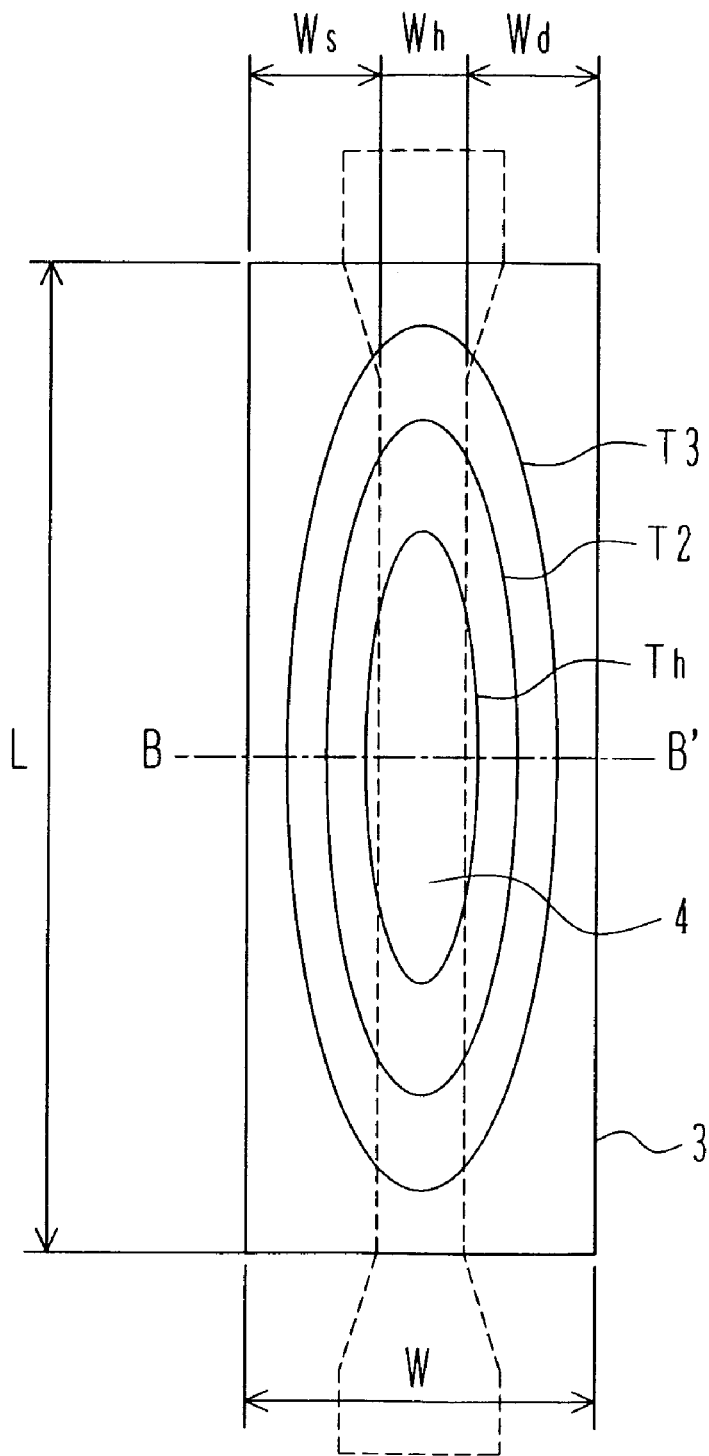
FIG. 8 is a graph showing a temperature distribution in the diaphragm portion 3 in a condition of no wind.
Figure 9:
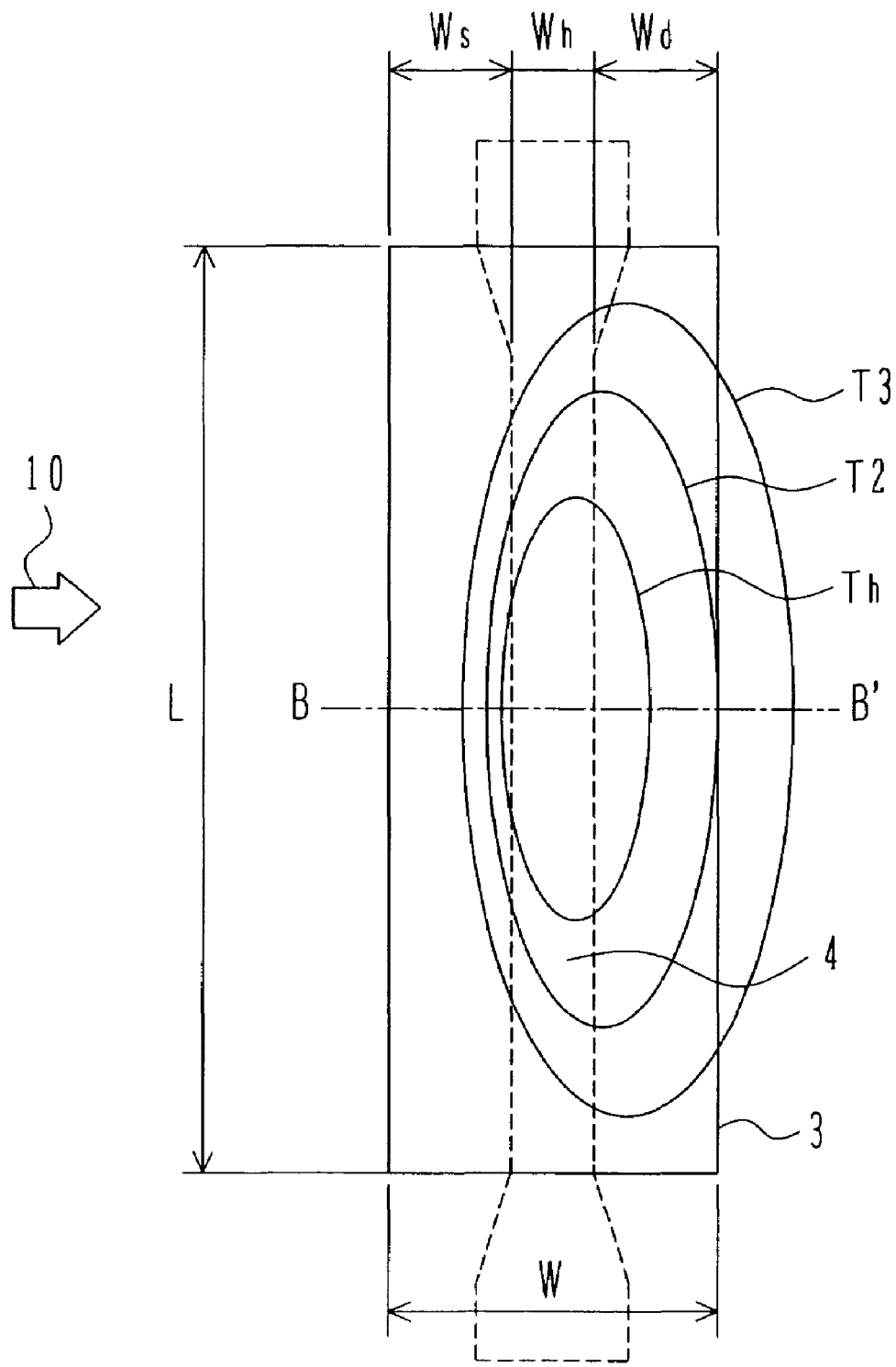
FIG. 9 is a graph showing a temperature distribution in the diaphragm portion 3 in the presence of a medium flow.

FIGS. 8 and 9 are each a graph showing a temperature distribution in the diaphragm portion 3 of the thermal flow sensor. More specifically, FIG. 8 represents the case of the medium flow 10 being absent, and FIG. 9 represents the case of the medium flow 10 being present.

The temperature distribution in the diaphragm portion 3 in the absence of the medium flow 10, shown in FIG. 8, is resulted such that a central area of the diaphragm 3 where the heating resistance 4 is arranged has the highest temperature and shows an isothermal distribution in the form of an elliptic line indicating the temperature (Th). Approaching an outer periphery of the diaphragm portion, the temperature gradually lowers to T2 and then to T3 (Th>T2>T3) while showing an isothermal distribution in the form of an elliptic line in each area. The temperature of the substrate 2 around the diaphragm portion 3 is substantially the same as the medium temperature (Ta) because the substrate 2 is formed of a single-crystal Si substrate having a high thermal conductivity and the substrate volume is sufficiently large (namely, the substrate has a large heat capacity).

The temperature distribution in the diaphragm portion 3 in the presence of the medium flow 10, shown in FIG. 9, is represented by an isothermal distribution in the form of elliptic lines entirely shifted toward the downstream side for the reason that the temperature in an area upstream of the heating resistance 4 is lowered due to the cooling effect of the medium, while an area downstream of the heating resistance 4 is warmed up by the heating resistance 4. However, since the central area of the diaphragm 3 where the heating resistance 4 is arranged is always heated, it shows an isothermal distribution in the form of an elliptic line indicating the temperature (Th) almost similarly to the case of no wind, shown in FIG. 8.

As seen from FIGS. 8 and 9, the temperature gradient in the diaphragm portion is maximum in a zone along the line indicated by B–B' at the middle of the diaphragm portion 3. With attention focused on such a zone, FIG. 10 shows a section of the diaphragm portion 3 along the line B–B' and the temperature distributions in that section.

Figure 10:
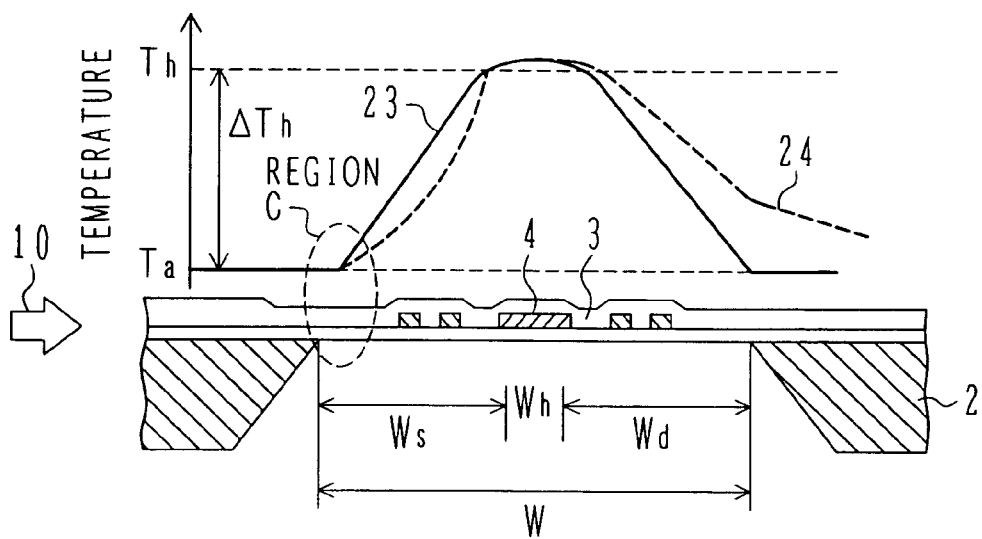
FIG. 10 is an explanatory view showing the temperature distributions of FIGS. 8 and 9 in a section of the diaphragm portion 3.

Referring to FIG. 10, the width of the diaphragm portion 3 is W, the width of the heating resistance 4 is Wh, the distance from the upstream end of the heating resistance 4 to the upstream end of the diaphragm portion 3 is Ws, and the distance from the downstream end of the heating resistance 4 to the downstream end of the diaphragm portion 3 is Wd. In view of the occurrence of a backward flow and symmetry of the temperature distribution, the downstream-side distance Wd is preferably designed to be the same as Ws representing the upstream-side distance. A solid line 23 indicates a medium temperature distribution right above the diaphragm, which corresponds to the temperature distribution, shown in FIG. 8, in the condition of no wind, and a dotted line 24 indicates a medium temperature distribution right above the diaphragm, which corresponds to the temperature distribution, shown in FIG. 9, in the presence of the medium flow 10. The substrate 2 has the same temperature as the air temperature (Ta), and the heating resistance 4 is heated to Th higher than the temperature (Ta) by the constant temperature (ΔTh=Th−Ta).

Here, in consideration of that the heated temperature (Th) of the heating resistance 4 shows the isothermal distribution in the form of an elliptic line in each area of the diaphragm portion 3 as shown in FIGS. 8 and 9, the temperature (Th) is defined as an average temperature of the heating resistance 4 on the diaphragm portion 3 (i.e., an average temperature calculated from the resistance value of the heating resistance 4 and the resistance temperature coefficient).

As seen from FIG. 10, the temperature distribution 23 in the condition of no wind shows a sharp change in the temperature distribution at both the upstream and downstream ends of the diaphragm portion 3. On the other hand, the temperature distribution 24 in the presence of the medium flow 10 shows a sharp change in the temperature distribution only in a region C at the upstream end of the diaphragm portion 3. The reason is that air heated by the heating resistance 4 flows toward the downstream side and the medium temperature at the downstream end of the diaphragm portion is so raised as to provide a moderate temperature distribution.

When the thermal flow sensor is mounted in an internal combustion engine for an automobile, etc. in practical use, an ordinary flow speed of intake air flowing as the medium flow 10 is 0.25 m/sec or over even at the lowest flow speed. In that condition, the temperature distribution sharply changes only in the region C at the upstream end of the diaphragm portion 3 as compared the downstream end thereof. Accordingly, the term of "grad(Ta)" in the above-mentioned formula (1) is increased, whereby the active force due to the thermophoretic effect is concentrated in the region C and the floating fine particles, such as the carbon particles, are deposited there. The above discussion is to explain the phenomenon, described above with reference to FIGS. 6 and 7, that after the use for a long term, the floating fine particles, such as carbon particles, are deposited only upstream of the diaphragm 3 at its boundary with respect to the substrate 2 and in a central area along the boundary in a concentrated way.

Deposition states of the floating fine particles, such as the carbon particles, after the use for a long term were studied in various conditions. As a result, strong correlation was found between the term of "grad(Ta)" in the above-mentioned formula (1) expressing the thermophoretic effect, i.e., the gradient of the medium (air) temperature in a space (temperature distribution upstream of the diaphragm 3), and the deposition amount (height H) of the floating fine particles, such as the carbon particles.

Figure 11:
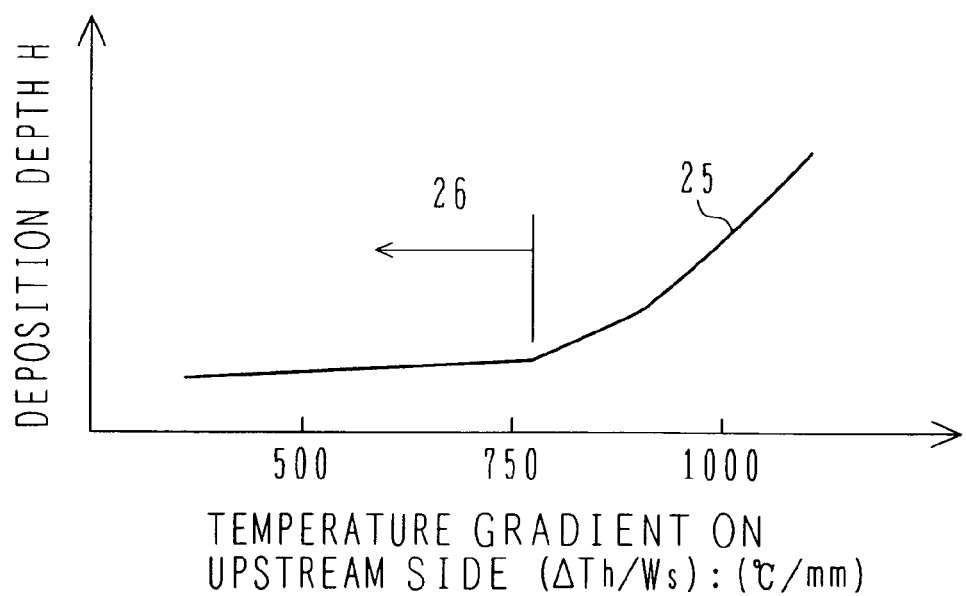
FIG. 11 is a graph showing the relationship between a temperature gradient and a carbon deposition height.

A curve 25 in FIG. 11 represents the result of measuring the deposition amount (height H) of the floating fine particles, such as the carbon particles, when the heated temperature (ΔTh=Th−Ta) of the heating resistance 4 and the distance (Ws) from the upstream end of the heating resistance 4 to the upstream end of the diaphragm portion 3 are changed variously. As a temperature gradient (ΔTh/Ws) upstream of the diaphragm portion 3 increases, the deposition height (H) also increases gradually. In particular, the deposition height (H) increases abruptly as the temperature gradient (ΔTh/Ws) exceeds 800 (° C./mm).

It is supposed that a region where the temperature gradient (ΔTh/Ws) is 800 (° C./mm) corresponds to a region (threshold) where the lowest flow speed of intake air in an internal combustion engine for an automobile, etc. is 0.25 m/sec or over in ordinary conditions and the particle size and mass of the floating fine particles, such as the carbon particles, generated in the internal combustion engine are balanced by the active force due to the thermophoretic effect expressed by the above-mentioned formula (1).

The deposition of the floating fine particles, such as the carbon particles, can be prevented by setting the heated temperature (ΔTh=Th−Ta) of the heating resistance 4 and the distance (Ws) from the upstream end of the heating resistance 4 to the upstream end of the diaphragm portion 3 so that, in FIG. 11, the temperature gradient (ΔTh/Ws) is in a region 26 where it is held not larger than 800 (° C./mm).

Looking more closely at the condition of the temperature gradient (ΔTh/Ws) being held not larger than 800 (° C./mm), the deposition of the floating fine particles, such as the carbon particles, was more noticeable particularly in a high temperatures range where the heated temperature (ΔTh) of the heating resistance 4 exceeds 160 (° C.). Then, the deposition of the floating fine particles, such as the carbon particles, was suppressed when the heated temperature (ΔTh) of the heating resistance 4 is not higher than 160 (° C.) and the distance (Ws) from the upstream end of the heating resistance 4 to the upstream end of the diaphragm portion 3 was not smaller than 0.2 mm. It is herein assumed, by way of example, that the length L is 2–3 mm, the width W is 700 μm, the width Wh is 100 μm, and the width Ws is 300 μm when the heated temperature (ΔTh) of the heating resistance 4 is set to 120 (° C.).

However, due care is required in setting the distance (Ws) because if the distance (Ws) is too large, the width (W) of the diaphragm portion 3 is increased, thus resulting in deterioration of mechanical strength and a drop of a response speed attributable to an increase in heat capacity of the diaphragm portion.

With the thus-constructed thermal flow sensor according to this embodiment of the present invention, by setting the temperature gradient (ΔTh/Ws) upstream of the diaphragm portion 3 to be not larger than 800 (° C./mm), it is possible to prevent the deposition of the floating fine particles, such as the carbon particles, caused by the thermophoretic effect and to improve reliability even when the thermal flow sensor is mounted in an internal combustion engine for an automobile, etc. and is used under severe environmental conditions for a long term. Furthermore, since any new additional part (such as a light emitting means) is no longer required unlike the related art, a highly reliable thermal flow sensor can be provided at a lower cost.

Figure 12:
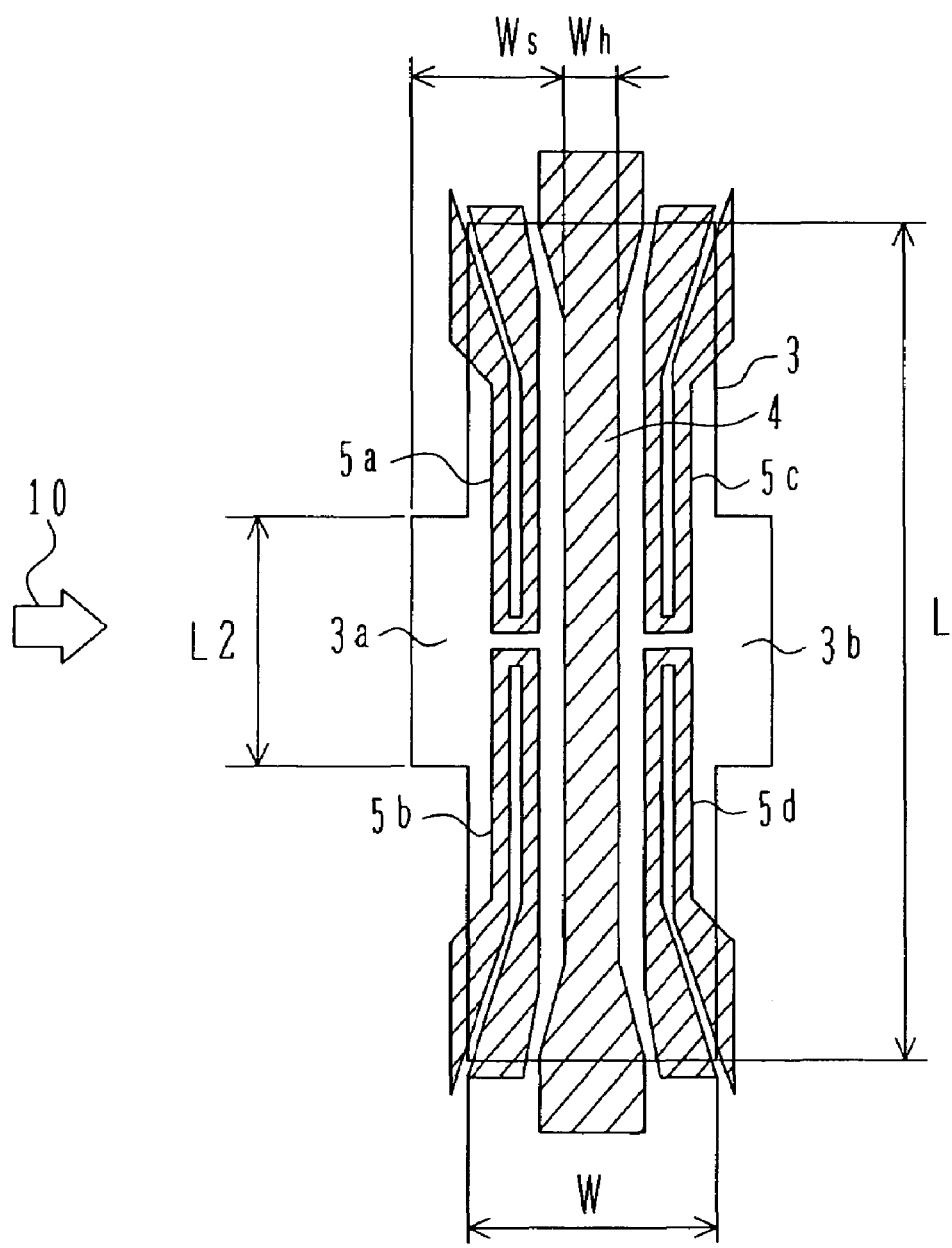
FIG. 12 is an enlarged view of a diaphragm portion 3 of a device according to a second embodiment of the present invention.

FIG. 12 is an enlarged view of a diaphragm portion 3 of a thermal flow sensor device 1 according to a second embodiment of the present invention. This second embodiment differs from the first embodiment, shown in FIG. 3, in that the diaphragm portion 3 is formed with widened portions 3a, 3b in its central area so as to provide a substantially cross-shaped diaphragm portion. A width L2 of each of the widened portions 3a, 3b can be set almost equal to the width of a high-temperature area of the heating resistance 4. Assuming the length L to be 2–3 mm, for example, the width L2 is set to about 1 mm.

With that construction, the width (W) of the diaphragm portion 3 in its peripheral areas can be reduced while securing, in the central area of the diaphragm portion 3, the distance (Ws) from the upstream end of the heating resistance 4 to the upstream end of the diaphragm portion 3. By reducing the width (W) of the diaphragm portion 3 in its peripheral areas, the deposition of the floating fine particles, such as the carbon particles, can be prevented without causing deterioration in mechanical strength of the diaphragm portion and a drop of the response speed caused by an increase of heat capacity.

Figure 13:
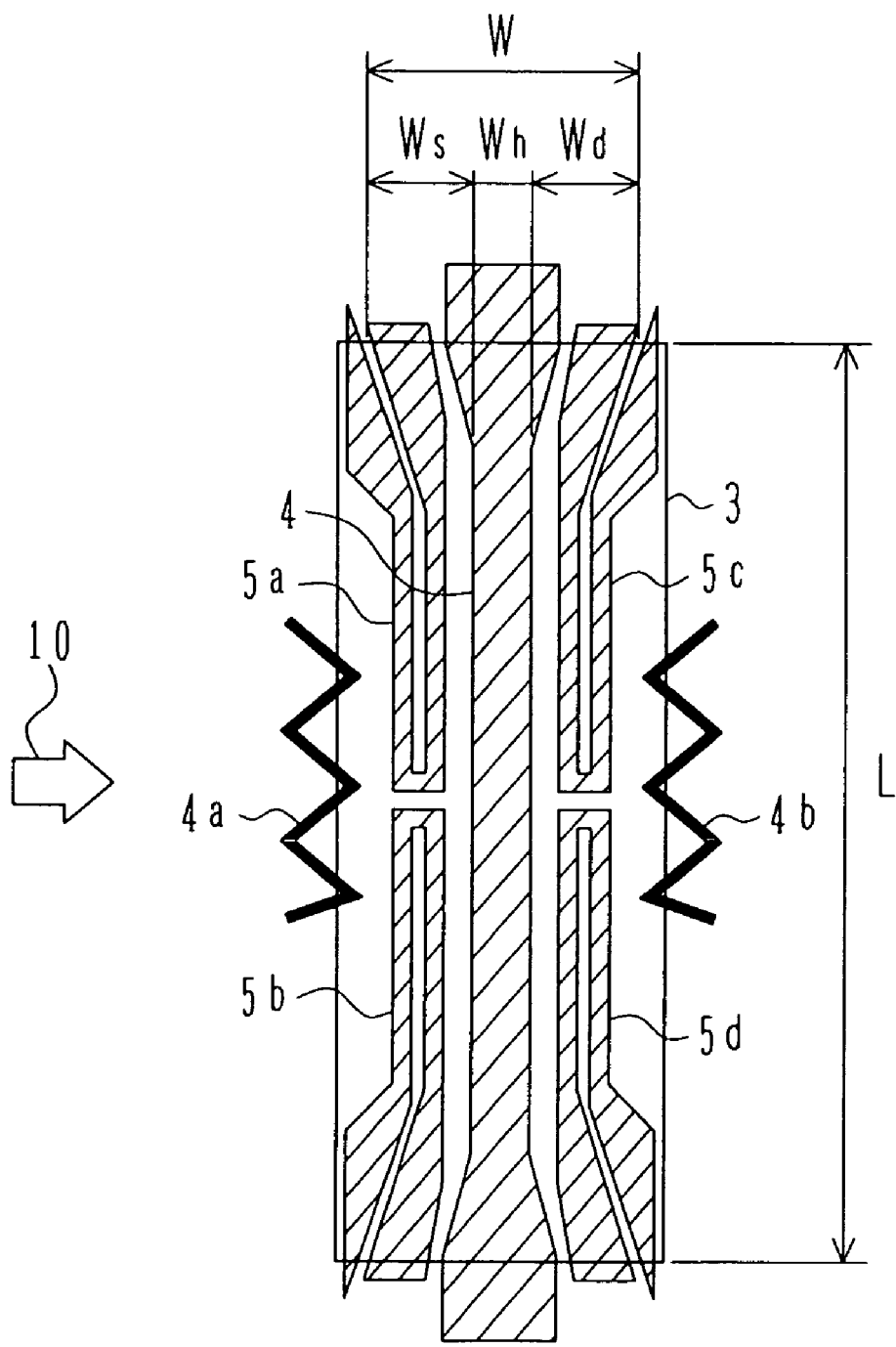
FIG. 13 is an enlarged view of a diaphragm portion 3 of a device according to a third embodiment of the present invention.

FIG. 13 is an enlarged view of a diaphragm portion 3 of a thermal flow sensor device 1 according to a third embodiment of the present invention. This third embodiment differs from the first embodiment, shown in FIG. 3, in that auxiliary heating resistances 4a, 4b are formed in the central area of the diaphragm portion 3 near its boundaries with respect to the substrate 2.

By forming the auxiliary heating resistances 4a, 4b and heating the central area of the diaphragm portion 3 near its boundaries with respect to the substrate 2 to a level of (intake temperature Ta+20 to 40° C.), for example, the sharp temperature distribution can be moderated in the region C, shown in FIG. 10, where the floating fine particles, such as the carbon particles, are most apt to deposit. It is hence possible to suppress the thermophoretic effect developed in the region C and to prevent the deposition of the floating fine particles, such as the carbon particles.

Further, by monitoring the electrical conduction states of the auxiliary heating resistances 4a, 4b, self-diagnosis information can be obtained which is effective in detecting breakage of the diaphragm portion 3 caused by any trouble.

The method of fabricating the thermal flow sensor device 1 according to the embodiment of the present invention will be described below.

A substrate is prepared as the semiconductor substrate 2 made of, e.g., single-crystal silicon (Si). On the surface of the semiconductor substrate 2 made of single-crystal silicon (Si) and serving as a base, silicon dioxide ($SiO_2$) and silicon nitride ($Si_3N_4$) are coated by thermal oxidation or CVD, for example, to form the electrical insulation film 8a in a predetermined thickness of about 1 μm. Then, a semiconductor thin film made of polycrystalline silicon (Si) and having a thickness of about 1 μm is coated on the electrical insulation film 8a by CVD, for example, to form a resistance.

Then, impurities are diffused in the semiconductor thin film made of polycrystalline silicon (Si) by a high-density doping process so as to provide a predetermined resistivity. Further, the semiconductor thin film made of polycrystalline silicon (Si) is patterned, for example, by a method of forming a resist in a predetermined form by the known photolithographic techniques and selectively removing the semiconductor thin film by reactive ion etching, to thereby obtain the resistances 4, 5a, 5b, 5c, 5d and 6 and the wired connecting portions 11 (11a, 11b, 11c, 11d, 11e, 11f, 11g, 11h, 11i, 11j, 11k and 11l).

In a subsequent step, as the step of forming the electrical insulation film 8a, silicon dioxide ($SiO_2$) and silicon nitride ($Si_3N_4$) are coated by CVD, for example, to form the protective film 8b in a predetermined thickness of about 1 micron.

Then, the protective film 8b is removed in areas corresponding to the terminals 12 (12a, 12b, 12c, 12d, 12e, 12f, 12g and 12h) for connection to the external circuit, and the terminal electrodes 12 are formed using, e.g., aluminum or gold. The wired connecting portions 11 for connecting the resistances and the terminals 12 to each other may be formed as a multilayered structure comprising the semiconductor thin film made of polycrystalline silicon (Si) and aluminum, gold or the like.

In a final step, the cavity 7 is formed by coating a mask material for etching in a predetermined pattern on the rear surface of the semiconductor substrate 2 made of single-crystal silicon (Si), and carrying out anisotropic etching of the semiconductor substrate by using an etchant, e.g., potassium hydroxide (KOH). The thermal flow sensor device 1 of the embodiment is thus completed.

While the above embodiments have been described in connection with the case of using the semiconductor thin film made of polycrystalline silicon (Si) as the resistance, similar advantages can also be obtained with the case of using other suitable metal materials, such as platinum.

Further, while the heating resistance 4 has been described as being formed on the diaphragm portion 3 to linearly extend substantially in the shape of I, similar advantages can also be obtained with the case of forming the heating resistance 4 substantially in the shape of U or a meandering (zigzag) pattern.

While the above embodiments have been described as arranging two pairs of temperature measuring resistances 5a, 5b, 5c and 5d upstream and downstream of the heating resistance 4, similar advantages can also be obtained with the case of arranging one pair of temperature measuring resistances.

While the above embodiments have been described in connection with the temperature difference method of measuring the flow rate and the flow direction from the temperature difference between the temperature measuring resistances arranged upstream and downstream of the heating resistance 4, it is obvious that similar advantages can also be obtained with the case of using the direct heating method of measuring the flow rate from a heating current supplied to the heating resistance 4.

Figure 14:
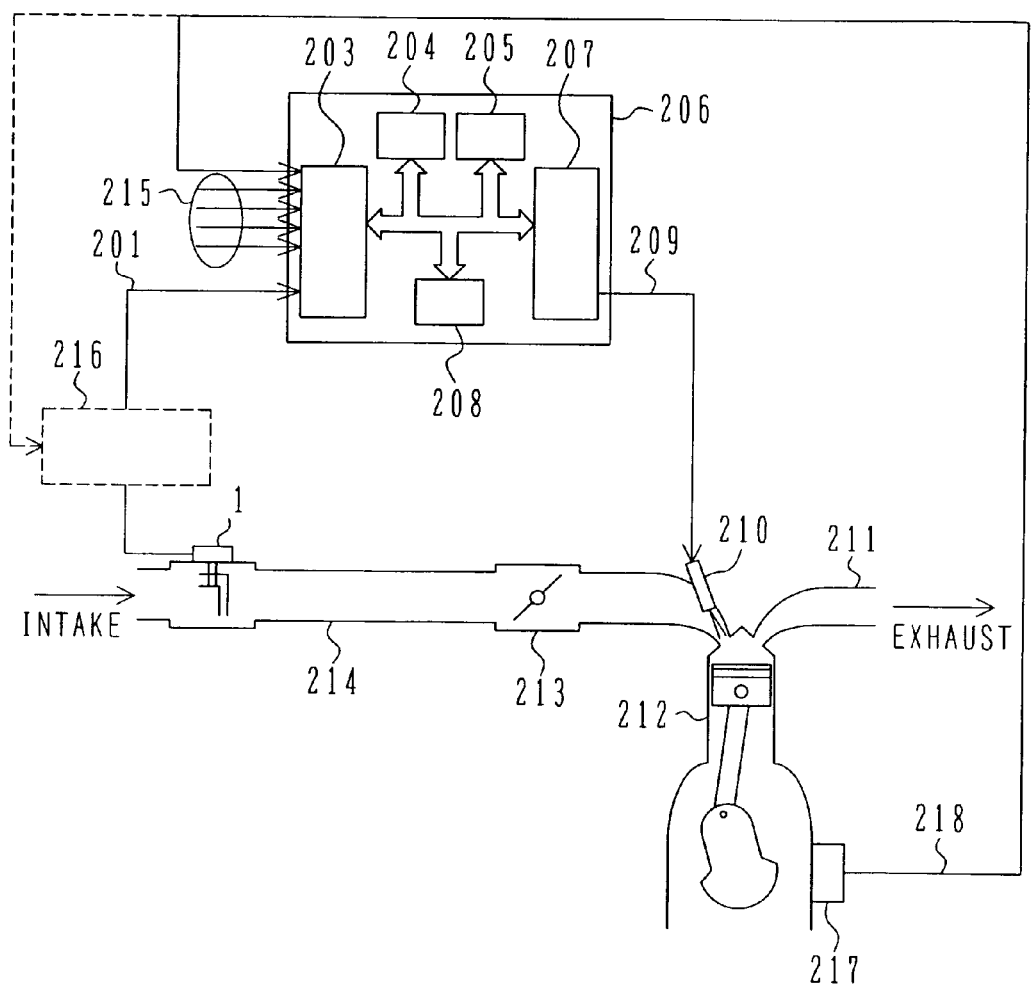
FIG. 14 is a block diagram of an electronic fuel injection system for an automobile engine employing the thermal flow sensor illustrated as any of the embodiments of the present invention.

The construction of an electronic fuel injection system for an automobile engine employing the thermal flow sensor according to any of the embodiments of the present invention will be described with reference to FIG. 14.

Air taken into for supply to an engine 212 passes through an air cleaner (not shown), and the flow rate of the intake air is measured by the thermal flow sensor 1. Then, after passing through an intake pipe 214 and a throttle 213, the intake air is mixed with fuel supplied from an injector 210 and flows into the engine 212. The fuel mixed with air is burnt in the engine 212 and exhausted, as exhaust gases, to the atmosphere through an exhaust pipe 211. A signal 201 outputted from the thermal flow sensor 1, a signal 218 outputted as an auxiliary signal from, e.g., a crank angle sensor 217, and various signals 215 outputted from an air-fuel ratio sensor (not shown), etc. for monitoring the operating state are inputted to an engine control unit (referred to as an "ECU" hereinafter) 206. Then, the amount of fuel injected from the injector 210 is set so that an optimum operating state is obtained in, e.g., the lean-burn operation.

The ECU 206 primarily comprises an input port 203, a RAM 204, a ROM 205, a CPU 208, and an output port 207. The signals inputted to the ECU 206 are subjected to arithmetic/logical processing and are sent as control signals to various actuators (not shown) from the output port 207. In FIG. 14, there is shown, for example, only a signal 209 sent to the injector 210.

While processing to compute the air-flow rate is executed in the ECU 206 in the illustrated example, the computational processing may be executed in the thermal flow sensor 1 itself or a preprocessor 216. Also, a part of the necessary processing may be executed in the thermal flow sensor 1 or the preprocessor 216. When the preprocessor 216 is used to execute a part of the processing, the least necessary signal for the preprocessor 216 is the signal from the thermal flow sensor 1.

INDUSTRIAL APPLICABILITY

According to the present invention, a thermal flow sensor is provided which can prevent deposition of floating fine particles, such as carbon particles, caused by the thermophoretic effect, can be fabricated at a low cost, and has high reliability.

The invention claimed is:

1. A thermal flow sensor including at least a heating resistance formed over a cavity, which is formed in a semiconductor substrate, near the center of said cavity with an electrical insulation film interposed between said heating resistance and said cavity, said sensor measuring a flow rate by controlling a temperature of said heating resistance to be higher than a temperature of a medium to be measured by a constant temperature, wherein the temperature (Th) of said heating resistance is controlled to be higher than the medium temperature (Ta) by a constant temperature ($\Delta Th = Th - Ta$), and a distance (Ws) in the direction of airflow from an upstream end of said heating resistance to an upstream end of said electrical insulation film lying over said cavity and the constant temperature ($\Delta Th$) satisfy the following relationship:

$$\Delta Th/Ws \leq 800 (° C./mm).$$

2. The thermal flow sensor according to claim 1, wherein the constant temperature ($\Delta Th$) is not higher than 160° C. and the distance (Ws) is not smaller than 0.2 mm.

3. The thermal flow sensor according to claim 1, wherein at least one pair of temperature measuring resistances are formed on said electrical insulation film lying over said cavity upstream and downstream of said heating resistance in spaced relation, and the flow rate is measured from a temperature difference between said pair of temperature measuring resistances.

4. The thermal flow sensor according to claim 1, wherein said electrical insulation film lying over said cavity is substantially rectangular in shape, and a central area of said cavity is partly widened to have an increased width larger than a width (W) of said cavity in a flow direction of the medium, thereby providing a substantially cross shape.

5. The thermal flow sensor according to claim 1, wherein said electrical insulation film lying over said cavity is substantially rectangular in shape, and auxiliary heating resistances are formed at upstream and downstream ends of said electrical insulation film to heat boundaries of said electrical insulation film at the upstream and downstream ends thereof.

6. The thermal flow sensor according to claim 5, wherein breakage of said electrical insulation film is self-diagnosed from electrical conduction states of said auxiliary heating resistances.

7. The thermal flow sensor according to claim 1, wherein a flow speed of the medium to be measured is set 0.25 m/sec or over at the lowest flow speed in ordinary conditions.

8. An internal combustion engine control unit wherein an amount of intake air in an internal combustion engine is measured using the thermal flow sensor according to claim 1, and a fuel injection amount is controlled.

* * * * *